United States Patent
Horovitz et al.

(10) Patent No.: US 10,642,923 B2
(45) Date of Patent: May 5, 2020

(54) GRAPHS WITH NORMALIZED ACTUAL VALUE MEASUREMENTS AND BASELINE BANDS REPRESENTATIVE OF NORMALIZED MEASUREMENT RANGES

(71) Applicant: MICRO FOCUS LLC, Santa Clara, CA (US)

(72) Inventors: Yair Horovitz, Yehud (IL); Maria Smolkov, Yehud (IL); Nurit Peres, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 413 days.

(21) Appl. No.: 15/506,393

(22) PCT Filed: Apr. 1, 2015

(86) PCT No.: PCT/US2015/023827
§ 371 (c)(1),
(2) Date: Feb. 24, 2017

(87) PCT Pub. No.: WO2016/160008
PCT Pub. Date: Oct. 6, 2016

(65) Prior Publication Data
US 2018/0060281 A1    Mar. 1, 2018

(51) Int. Cl.
*G06F 17/18* (2006.01)
*G06F 11/34* (2006.01)
(Continued)

(52) U.S. Cl.
CPC ............ *G06F 17/18* (2013.01); *G06F 11/323* (2013.01); *G06F 11/3409* (2013.01);
(Continued)

(58) Field of Classification Search
CPC ............... G06F 11/3409; G06F 11/323; G06F 2201/81; G06F 17/18; G06F 11/3495;
(Continued)

(56) References Cited

U.S. PATENT DOCUMENTS 7,788,365 B1    8/2010  Foster et al.
7,941,742 B1    5/2011  Hao et al.
(Continued)

OTHER PUBLICATIONS

Screenshot from YouTube.com Video, https://www.youtube.com/watch?v=NQg6wq2jJpl, Normalising Data for plotting graphs in Excel, by Dory Video, Published Feb. 9, 2015, 1 page, copy right 2015 James Clark.*
(Continued)

*Primary Examiner* — Mischita L Henson (57) ABSTRACT

In one example of the disclosure, an expected measurement range is identified for each of a set of metrics. Actual value measurements are obtained for each of the metrics. Each of the identified expected measurement ranges and the actual value measurements are normalized according to a common scale. A graph is caused to be displayed. The graph includes a baseline band representative of the normalized measurement ranges, and includes the normalized actual value measurements plotted relative to the baseline band.

19 Claims, 7 Drawing Sheets

(51) Int. Cl.
*G06F 11/32* (2006.01)
*G09G 5/00* (2006.01)
*G06F 11/30* (2006.01)

(52) U.S. Cl.
CPC ........... *G06F 11/3452* (2013.01); *G09G 5/00* (2013.01); *G06F 11/3089* (2013.01); *G06F 11/3495* (2013.01); *G06F 2201/81* (2013.01); *G09G 2340/14* (2013.01)

(58) Field of Classification Search
CPC ... G06F 11/3089; G06F 11/3452; G09G 5/00; G09G 2340/14
See application file for complete search history.

(56) References Cited

U.S. PATENT DOCUMENTS

| | | | |
|---|---|---|---|
| 8,667,334 B2 | 3/2014 | Dagan | |
| 2003/0065986 A1 | 4/2003 | Fraenkel et al. | |
| 2005/0278703 A1* | 12/2005 | Lo .................... | G06F 11/0709 717/126 |
| 2008/0016412 A1 | 1/2008 | White et al. | |
| 2008/0109730 A1 | 5/2008 | Coffman et al. | |
| 2008/0215576 A1 | 9/2008 | Zhao et al. | |
| 2009/0177692 A1 | 7/2009 | Chagoly et al. | |
| 2009/0312983 A1 | 12/2009 | Lee et al. | |
| 2012/0054331 A1 | 3/2012 | Dagan | |
| 2014/0095696 A1 | 4/2014 | Sala et al. | |
| 2016/0147583 A1* | 5/2016 | Ben Simhon ......... | G06F 11/076 714/47.3 |
| 2017/0192872 A1* | 7/2017 | Awad ...................... | G06F 17/18 |

OTHER PUBLICATIONS

Screenshot from YouTube.com Video, https://www.youtube.com/watch?v=6awq3FqbEKQ, Create a Line Chart with a Target Range, by Doug H., Published Apr. 30, 2011, 1 page.*

Charles R. Barker, Jr., Measurement Analysis and Anomaly Detection, IEEE, 2003, 0-7803-7837-7/03, pp. 226-237.*

Miao Jiang et al., Automatic Fault Detection and Diagnosis in Complex Software Systems by Information-Theoretic Monitoring, IEEE, 2009, 978-1-4244-4421-2/09, pp. 285-294.*

International Search Report & Written Opinion received in PCT Application No. PCT/US2015/023827, dated Apr. 22, 2016, 13 pages.

Tariq, D. et ai., "Identifying the Provenance of Correlated Anomalies," (Research Paper), Mar. 21-25, 2011, 6 pages, available at http://web.engr.illinois.edu/~tahir2/publications/identifying-provenance.pdf.

Screenshots from YouTube Video, https://www.youtube.com/watch?v=Oi1QfTxSCgl, How to Create a Baseline With Excel : Using Excel & Spreadsheets, by Jesica Garrou, Oct. 2013 (2 pages).

* cited by examiner

GRAPHS WITH NORMALIZED ACTUAL VALUE MEASUREMENTS AND BASELINE BANDS REPRESENTATIVE OF NORMALIZED MEASUREMENT RANGES

BACKGROUND

Anomaly detection is an effective method of identifying potential problems in behaviors of manmade and natural systems. For example, an ability to identify and understand significant anomalies in system performance can be a key factor to successful operation of a computer system. Likewise, an ability to identify and understand significant anomalies in a natural system, e.g., an ecosystem, can enable prompt implementation of preparatory or remedial actions.

DETAILED DESCRIPTION

Introduction:

One method of detecting system anomalies is to track multiple metrics relative to the system and to identify situations where multiple metrics are behaving abnormally in close proximity to each other. When several abnormalities are happening in close proximity it can be a signal of a significant anomaly, versus a single abnormal metric that abnormality that may be indicative of an arbitrary occurrence.

However, it may be difficult to visually identify an anomalous system based on several breaches happening at the same time or within a close time proximity, as it has been challenging to provide an easily understood display of the multiple baseline breaches. Displays of multiple metrics and their baselines have included multiple graphs arranged next to each other, with each graph showing a metric and a baseline range or baseline for that metric. In these conditions, users may find it difficult to visually track multiple metrics against a common point in time or period of time. Another approach may be to graphically display a baseline as a single line concurrent with display of measured data points. However this approach can be unsatisfactory in some situations where the baseline is to be a range of values (e.g., a baseline range or baseline sleeve), and/or the displayed graph is to track the measured data points against multiple baselines.

To address these issues, various examples described in more detail below provide a system and a method for enabling graphs with normalized actual value measurements and baseline bands that are representative of normalized measurement ranges. In an example, an expected measurement range for each of a set of metrics is identified. In a particular example, the set of metrics may be a set of performance metrics for a computer system. In other examples, the set of metrics may be performance metrics unrelated to a computer system, e.g., a set of metrics relating to business valuation (e.g., return on investment, earnings per share, debt-service coverage ratio). In other examples, the set of metrics may be a set of metrics not necessarily relating to performance, e.g., metrics that measure characteristics of an object, person, or entity (e.g., height, weight, debt to equity, etc.), or metrics that measure weather, climate or other natural phenomena (e.g., temperature, precipitation, wind, air pressure, humidity, etc.). In a particular example of the disclosure, historical data for each of the set of metrics is obtained, and the expected measurement range for each of the set of metrics is calculated utilizing the historical data.

Actual value measurements for each of the metrics are obtained. Each of the identified expected measurement ranges and the actual value measurements are normalized according to a common scale. In one example of the disclosure, the identified expected measurement ranges and the actual value measurements may be normalized according to a standard deviation scale. In another example of the disclosure, the identified expected measurement ranges and the actual value measurements may be normalized according to a percentile scale. A graph is caused to be displayed, the graph including a baseline band representative of the normalized measurement ranges, and including the normalized actual value measurements plotted relative to the baseline band.

In this manner, the disclosed examples enable display of normal ranges for different metrics together with actual values on a same graph according to a common scale. A user that observes the displayed graph, or a system that scans the displayed graph, can easily identify where actual value measurements are within a normal range (e.g. inside the baseline range), and where the actual value measurements are outside of the baseline with a close time proximity. Examples disclosed herein can thus be useful for efficient visual identification of abnormal or unexpected behaviors in manmade and natural systems, such that preparatory, remedial, or corrective actions can be quickly implemented.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of enabling graphs with normalized actual value measurements and baseline bands representative of normalized measurement ranges. The fourth section, labeled "Operation," describes implementation of various examples.

Figure 1:
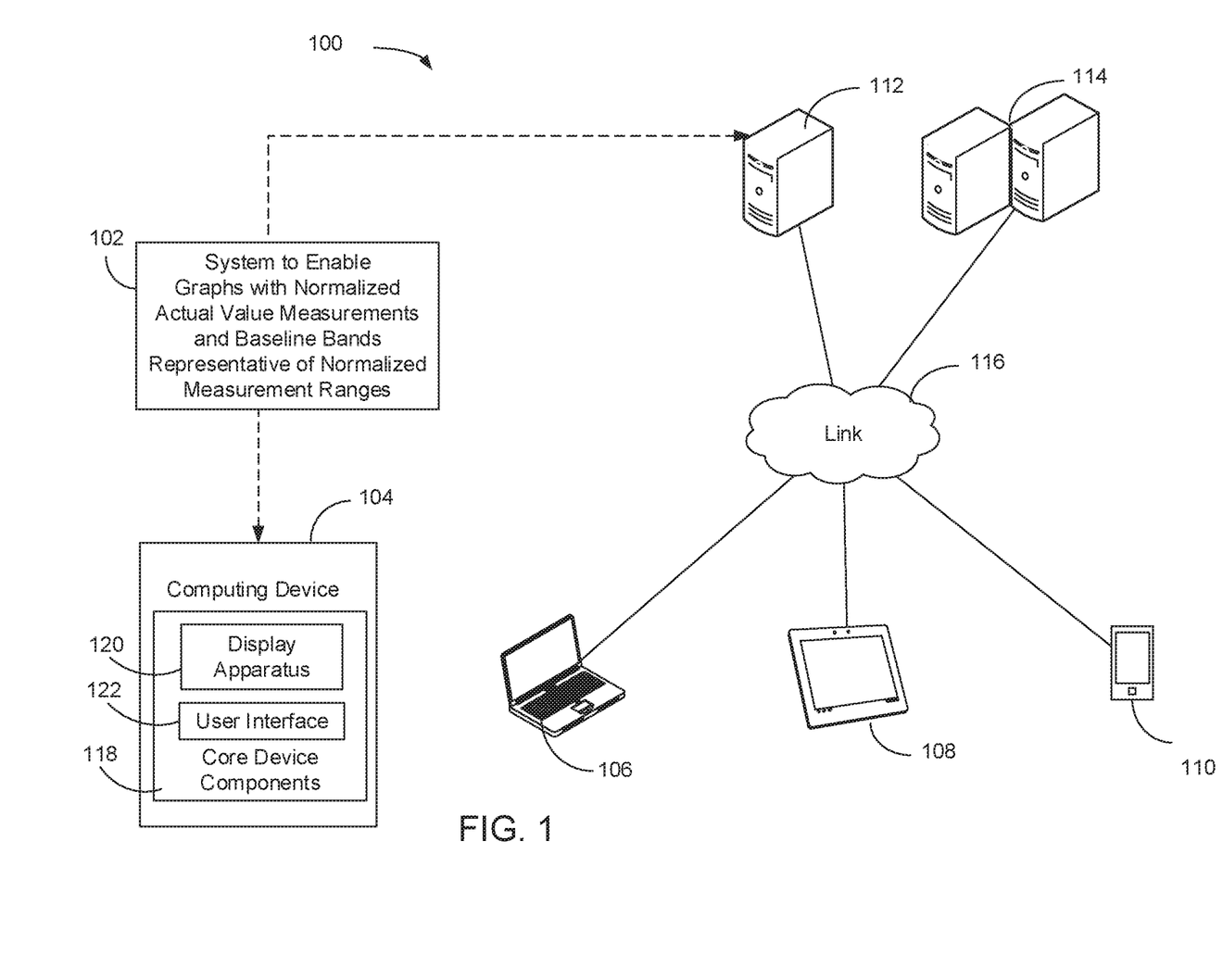
FIG. 1 is a block diagram depicting an example environment in which various examples of the disclosure may be implemented.

Environment:

FIG. 1 depicts an example environment 100 in which examples may be implemented as a system 102 for enabling graphs with normalized actual value measurements and baseline bands representative of normalized measurement ranges. Environment 100 is shown to include computing device 104, client devices 106, 108, and 110, server device 112, and server devices 114. Components 104-114 are interconnected via link 116.

Link 116 represents generally any infrastructure or combination of infrastructures to enable an electronic connection, wireless connection, other connection, or combination thereof, to enable data communication between components 104-114. Such infrastructure or infrastructures may include, but are not limited to, a cable, wireless, fiber optic, or remote connections via telecommunication link, an infrared link, or a radio frequency link. For example, link 116 may represent the internet, intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally any computing device with which a user may interact to communicate with other client devices, server device 112, and/or server devices 114 via link 116. Server device 112 represents generally any computing device to serve an application and corresponding data for consumption by components 104-110 and 114. Server devices 114 represent generally a group of computing devices collectively to serve an application and corresponding data for consumption by components 104-110 and 112.

Computing device 104 represents generally any computing device with which a user may interact to communicate with client devices 106-110, server device 112. and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming to enable graphs with normalized actual value measurements and baseline bands representative of normalized measurement ranges. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. For example, components that implement the measurement range engine 202 functionality of identifying an expected measurement range for each of a set of metrics and the observed values engine 204 functionality of obtaining actual value measurements for each of the metrics may be included within computing device 104. Continuing with this example, components that implement the common scale engine 206 functionality of normalizing each of the identified expected measurement ranges and the actual value measurements according to a common scale, and the display engine 208 functionality of causing display of a graph, the graph including a baseline band representative of the normalized measurement ranges, and including the normalized actual value measurements plotted relative to the baseline band may be components included within a server device 112. Other distributions of system 102 across computing device 104, client devices 106-110, server device 112, and server devices 114 are possible and contemplated by this disclosure. It is noted that all or portions of system 102 to enable graphs with normalized actual value measurements and baseline bands representative of normalized measurement ranges may also be included on client devices 106, 108 or 110.

Figure 2:
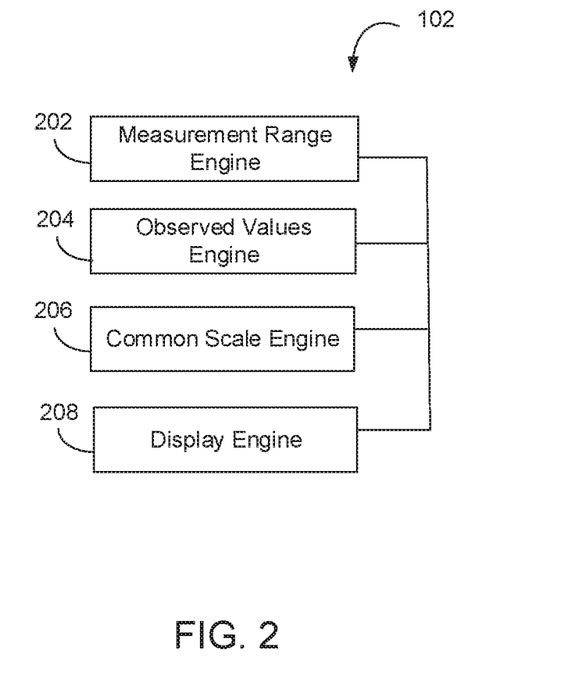
FIG. 2 is a block diagram depicting an example of a system to enable graphs with normalized actual value measurements and baseline bands representative of normalized measurement ranges.
Figure 3:
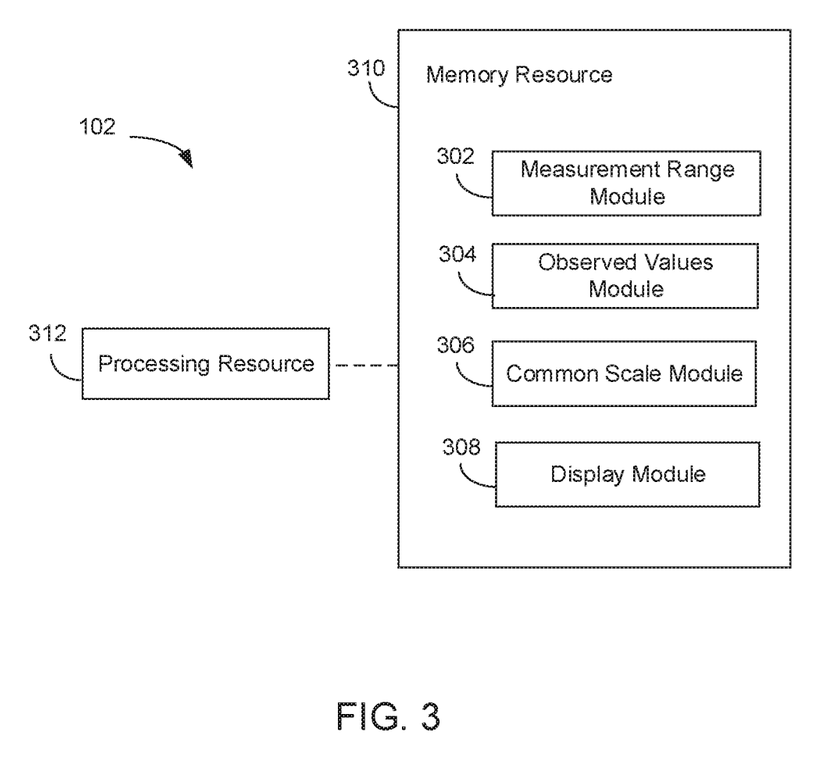
FIG. 3 is a block diagram depicting a memory resource and a processing resource to implement an example of enabling graphs with normalized actual value measurements and baseline bands representative of normalized measurement ranges.

Components:

FIGS. 2 and 3 depict examples of physical and logical components for implementing various examples. In FIG. 2 various components are identified as engines 202, 204, 206, and 208. In describing engines 202-208 focus is on each engine's designated function. However, the term engine, as used herein, refers generally to a combination of hardware and programming to perform a designated function. As is illustrated later with respect to FIG. 3 the hardware of each engine, for example, may include one or both of a processor and a memory, while the programming may be code stored on that memory and executable by the processor to perform the designated function.

FIG. 2 is a block diagram depicting components of a system 102 for enabling displays with baseline bands representative of normalized measurement ranges. In this example, system 102 includes measurement range engine 202, observed values engine 204, common scale engine 206. and display engine 208. In performing their respective functions, engines 202-208 may access a data repository, e.g., any memory accessible to system 102 that can be used to store and retrieve data. In an example, measurement range engine 202 represents generally a combination of hardware and programming to identify an expected measurement range for each of a set of metrics. As used herein, an "expected measurement range" refers generally to a span of measurements or degree of variation between upper and lower limits that is calculated, determined, prescribed, or provided for a given metric. In an example, the expected measurement range may be indicative of a range of measurements deemed normal or acceptable. As used herein, a "metric" refers generally to any measurement. As discussed previously, in examples, a metric may be a performance metric for a computer system (e.g., a measure of a speed, available memory, up-time, down-time, reliability, customer satisfaction, other measure of computer system performance). In other examples, a metric may be a performance metric unrelated to a computer system, (e.g., a measure of a speed, inventory, reliability, customer satisfaction, productivity, behavior, revenue, income, or any other measure of performance). In other examples, a metric may be a measurement of an attribute of an object, person, or entity not directly related to performance (e.g., height or weight), or may be a measurement of natural phenomena such as rainfall, outside temperature, etc.

In particular examples, measurement range engine 202 may obtain historical data for each of the set of metrics, and then calculate the expected measurement range for each of the set of metrics utilizing the historical data. As used herein, "historical data" refers generally to past value measurements relative to a metric or set of metrics. In an example wherein the set of metrics are performance metrics for a computer system, the historical data may be data relative to past processor speed measurements, past memory utilization measurements, past network error rate measurements, past transaction response time measurements, or any other past measurements relating to the computer system. In a particular example, measurement range engine 202 may obtain the historical data directly from a computer device that is the subject of metrics under consideration. In other examples, measurement range engine 202 may obtain the historical data from a database or other repository that warehouses historical data relative to the metrics under consideration. In examples, measurement range engine 202 may apply a Gaussian distribution or other statistical deviation or dispersion algorithm in calculating normal measurement range for each of the set of metrics.

Continuing with the example of FIG. 2, observed values engine 204 represents generally a combination of hardware and programming to obtain actual value measurements for each of the metrics of the set of metrics. As used herein, an "actual value measurement" refers generally to any measurement taken with respect to a metric. In an example wherein the metrics are performance metrics for a computer system, the actual value measurements may be measurements relative to processor speed, memory utilization, network error rate, transaction response time, or any other measurements related to the computer system. In an example, observed values engine 204 may obtain data indicative of the actual value measurements directly from a computer device that is the subject of metrics under consideration. In other examples, observed values engine 202 may obtain data indicative of the actual value measurements from a database or other repository that warehouses actual value measurements relative to the metrics under consideration. In a particular example in which the measurement range engine 202 obtains historical data for each of the set of metrics, and then calculates the expected measurement range for each of the set of metrics utilizing the historical data, the actual value measurements are measurements that are not historical data utilized in calculation of the expected measurement range.

Common scale engine 206 represents generally a combination of hardware and programming to normalize each of the identified expected measurement ranges and each of the actual value measurements according to a common scale. As used herein, to "normalize" a set of values refers generally to bringing or converting the set of value to a common scale. As used herein, a "common scale" for a set of values refers generally to any measurement scale that is shared by each of the values of the set. In an example, identified expected measurement ranges and actual value measurements may be normalized such that each of the identified expected measurement ranges and each of the actual value measurements are expressed in a standard deviation scale. In an another example, identified expected measurement ranges and actual value measurements may be normalized such that each of the identified expected measurement ranges and each of the actual value measurements are expressed in a percentile scale. It is contemplated by this disclosure that the identified expected measurement ranges and actual value measurements may be normalized such that each of the identified expected measurement ranges and each of the actual value measurements are expressed in a common scale other than the standard deviation and percentile scales.

Continuing with the example of FIG. 2, display engine 208 represents generally a combination of hardware and programming to cause display of a graph that includes a baseline band representative of the normalized measurement range. As used herein, a "display" refers generally to an exhibition or presentation caused by a computer for the purpose of perception by a user. In examples, a display may be a display to be presented at a computer monitor, touchscreen, or other electronic display device. As used herein, a "display device" refers generally to any combination of hardware and programming configured to exhibit or present the message or other information for perception by a user, and can include, but is not limited to, a visual, tactile or auditory display. The display device may be a monitor, a touchscreen, a projection device, or other means of presenting a visual display of a message. As used herein a "graph" refers generally to any chart, diagram or other graphic representation of data showing the relation between variable quantities. In an example, the graph includes an x-axis representative of time and a y-axis representative of an extent of deviation from the displayed baseline band. As used herein a "baseline band" refers generally to a subset area of a graph that identifies normalized measurement ranges relative to the other areas of the graph. In examples, the baseline band may be subset area of a graph that is delineated by a stripe, line, color, shading, texture, glossiness, or another other difference from the other areas of the graph.

Display engine 208 causes the display of the graph to include the normalized actual value measurements plotted relative to the baseline band. Those actual values that are plotted within the baseline band indicate values that are expected values, e.g., within an expected measurement range. Those actual values that are plotted outside the baseline band indicate values that are unexpected, e.g., outside of an expected measurement range. In an example, display engine 208 causes display of the graph such that the normalized actual value measurements that correspond to a same point in time or to a same time period are plotted with a same x-axis value, where the x-axis is representative of time and the y-axis is representative of extent of deviation from the displayed baseline band. In a particular example, the display of the graph include a single baseline band such that a human user can easily visually identify actual values within an expected measurement range even where the set of metrics includes three or more metrics.

In the foregoing discussion of FIG. 2, engines 202-208 were described as combinations of hardware and programming. Engines 202-208 may be implemented in a number of fashions. Looking at FIG. 3 the programming may be processor executable instructions stored on a tangible memory resource 310 and the hardware may include a processing resource 312 for executing those instructions. Thus memory resource 310 can be said to store program instructions that when executed by processing resource 312 implement system 102 of FIG. 2.

Memory resource 310 represents generally any number of memory components capable of storing instructions that can be executed by processing resource 312. Memory resource 310 is non-transitory in the sense that it does not encompass a transitory signal but instead is made up of more or more memory components to store the relevant instructions. Memory resource 310 may be implemented in a single device or distributed across devices. Likewise, processing resource 312 represents any number of processors capable of executing instructions stored by memory resource 310. Processing resource 312 may be integrated in a single device or distributed across devices. Further, memory resource 310 may be fully or partially integrated in the same device as processing resource 312, or it may be separate but accessible to that device and processing resource 312.

In one example, the program instructions can be part of an installation package that when installed can be executed by processing resource 312 to implement system 102. In this case, memory resource 310 may be a portable medium such as a CD, DVD, or flash drive or a memory maintained by a server from which the installation package can be downloaded and installed. In another example, the program instructions may be part of an application or applications already installed. Here, memory resource 310 can include integrated memory such as a hard drive, solid state drive, or the like.

In FIG. 3, the executable program instructions stored in memory resource 310 are depicted as measurement range module 302, observed values module 304, common scale module 306, and display module 308. Measurement range module 302 represents program instructions that when executed by processing resource 312 may perform any of the functionalities described above in relation to measurement range engine 202 of FIG. 2. Observed values module 304 represents program instructions that when executed by processing resource 312 may perform any of the functionalities described above in relation to observed values engine 204 of FIG. 2. Common scale module 306 represents program instructions that when executed by processing resource 312 may perform any of the functionalities described above in relation to common scale engine 206 of FIG. 2. Display module 308 represents program instructions that when executed by processing resource 312 may perform any of the functionalities described above in relation to display engine 208 of FIG. 2.

Figure 4:
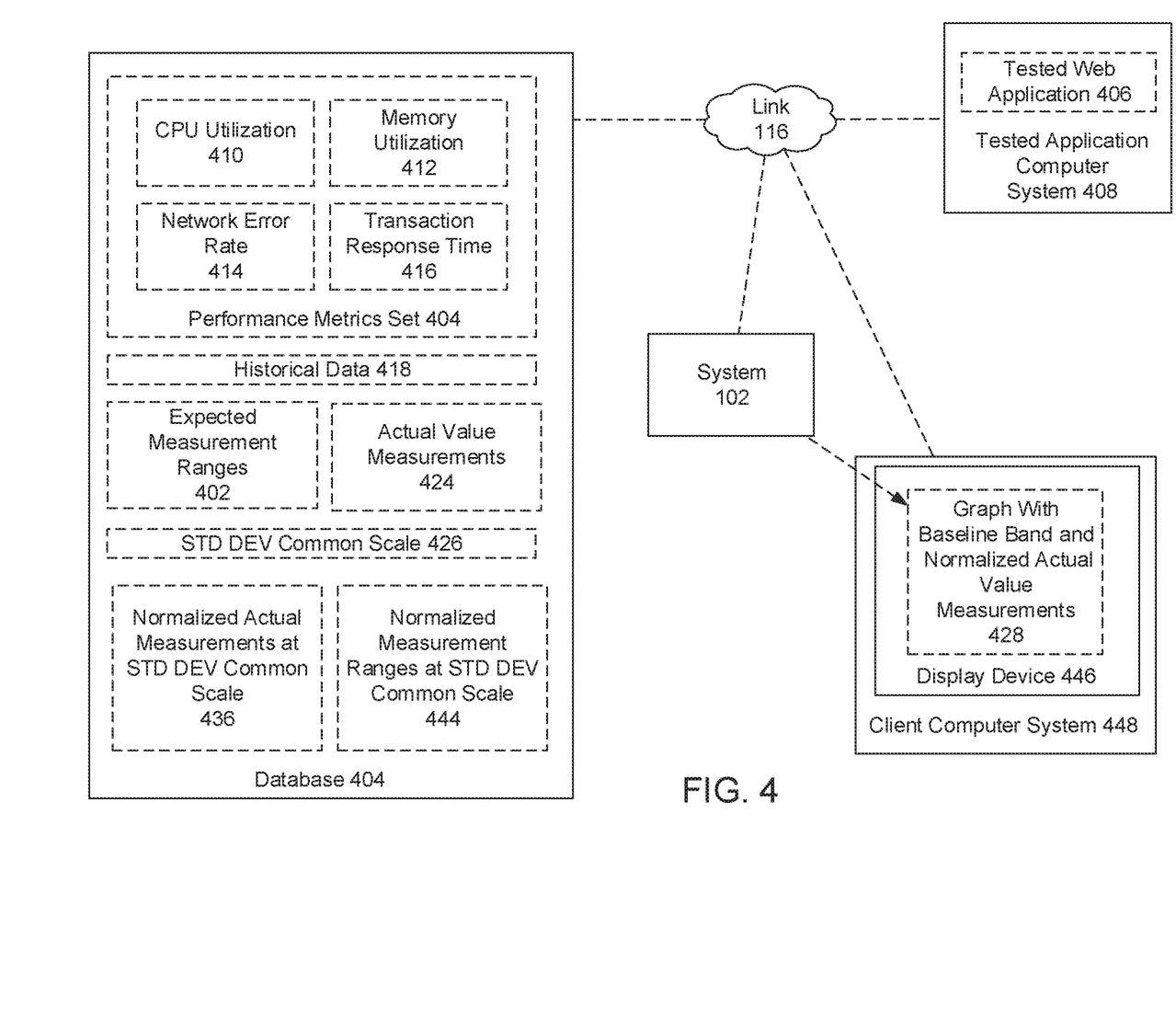
FIGS. 4, 5A, and 5B illustrate an example of calculating expected measurement ranges for computer system performance metrics, and enabling a display with a baseline band representative of normalized measurement ranges for the metrics.
Figure 5A:
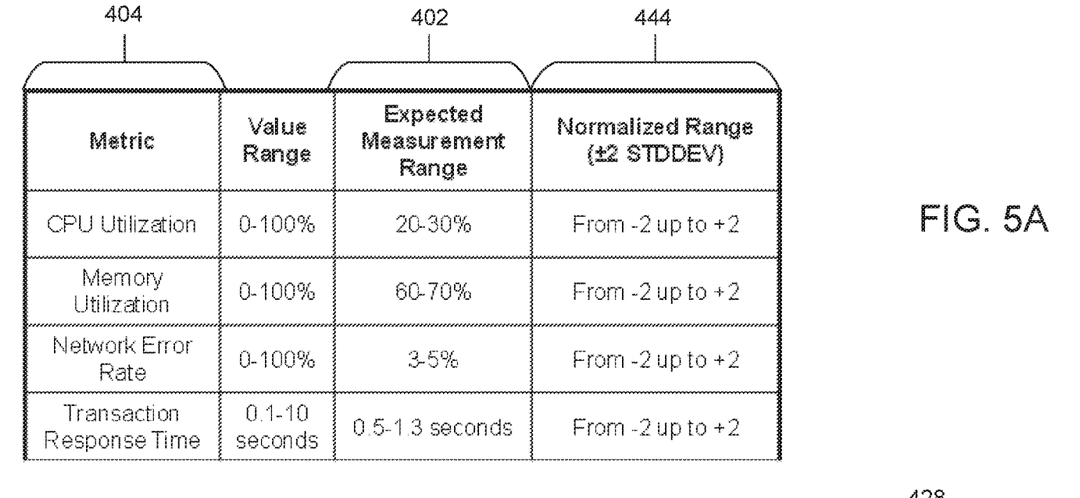
Figure 5B:
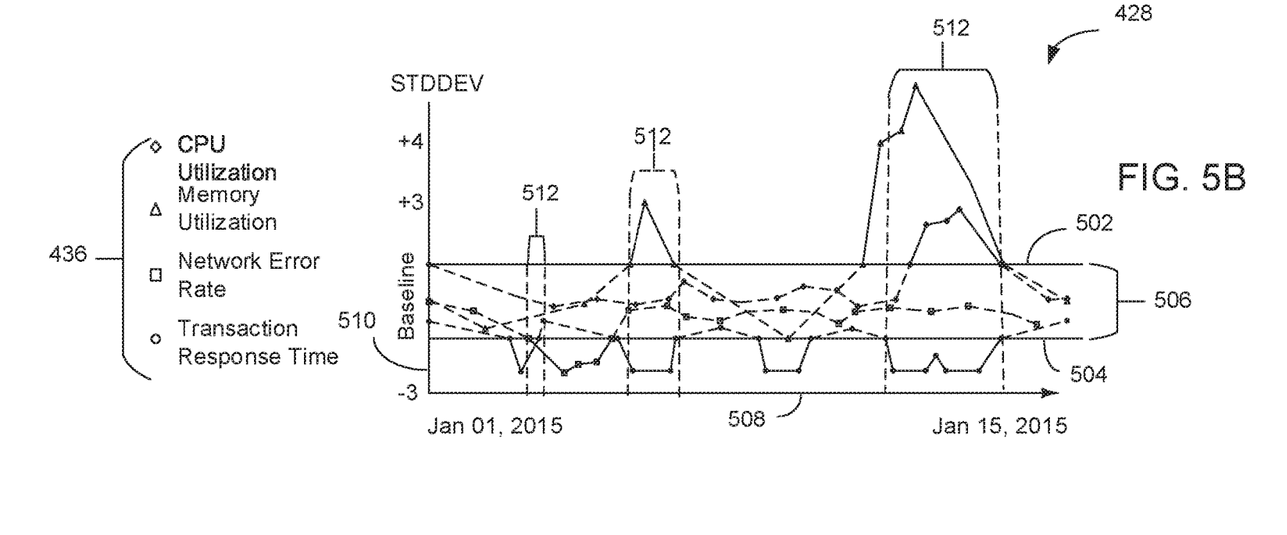

Illustrative Example:

FIGS. 4, 5A, and 5B, in view of FIG. 1, illustrate an example of system 102 for enabling graphs with normalized actual value measurements and baseline bands representative of normalized measurement ranges. Beginning at FIG. 4, in this example, display enablement system 102, hosted at a computing device such as server 112 (FIG. 1) or distributed over a set of computing devices such as server system 114 (FIG. 1), identifies an expected measurement range 402 for each of a set of performance metrics 404 for a tested web application 406 at a tested application computer system 408. In this example the set of performance metrics 404 includes metrics for CPU utilization 410, memory utilization 412, network error rate 414, and transaction response time 416.

In this example, system 102, in identifying the expected measurement ranges 402, obtains historical data 418 for each metric of the set of metrics 404 and then calculates the expected measurement range 402 for each of the metrics 410-416 of the set 404 utilizing the historical data 418. The actual value measurements 424 are distinct from the measurements for the set of metrics included within the historical data 418. In this example, system 102 accesses, via link 116, database 422 that warehouses historical data relative to the metrics under consideration. In another example, system 102 may access, via link 116, the tested application computer system 408 hosting the tested web application 406 to obtain the historical data 418.

Continuing at FIG. 4, system 102 obtains actual value measurements 424 for each of the metrics 410-416 of the set of metrics 404. In this example, system 102 obtains data indicate of the actual value measurements 424 from database 404 that warehouses actual value measurements relative to the set of metrics 404 under consideration. In another example, system 102 may obtain the actual values measurements data 424 directly from tested application computer system 408 that is hosting the tested web application 406.

Continuing at FIG. 4 and FIG. 5A, system 102 normalizes each of the identified expected measurement ranges 402 and each of the actual value measurements 424 according to a common scale 426 that is a standard deviation scale. In an another example, identified expected measurement ranges 402 and actual value measurements 424 could be normalized such that each of the identified expected measurement ranges and each of the actual value measurements are expressed in a common scale that is a percentile scale, or any other common scale.

Moving to FIG. 5B, in view of FIGS. 4 and 5A, system 102 causes display of a graph 428 that includes a first line 502 and a second line 504 delineating a baseline band 506, the baseline band 506 representative of the normalized measurement ranges 444 (FIG. 5A). In this example, system 102 sends to client computer system 448, via link 116, data to cause the graph 428 to be displayed at a display device 446 included with or accessible to client computer system 448. The graph 428 includes an x-axis 508 representative of time and a y-axis 510 representative of an extent of deviation from the displayed baseline band 506.

In this example, system 102 causes the display of the graph 428 such that the baseline band 506 is representative of a 2× multiple of a standard deviation and marks expected measurements plotted in the graph. In other examples, system 102 may cause the display of a graph such that the baseline band is representative of a multiple of a percentile or other common scale. In other examples, the baseline band 506 may include coloring, shading, texture, glossiness, or another other feature that differentiates the baseline band 506 from the other areas of the graph 428.

Continuing with the example of FIGS. 4, 5A, and 5B, system 102 causes the display of the graph 428 to include the normalized actual value measurements 436 plotted relative to the baseline band 506. Those normalized actual value measurements 436 that are plotted within the baseline band 506 indicate values that are expected values. Those normalized actual value measurements 436 that are plotted outside the baseline band 506 indicate measurements that are not expected, e.g., outside of an applicable expected measurement range 402. In this example, system 102 causes display of the graph 428 such that the normalized actual value measurements 436 that correspond to a same point in time are plotted with a same x-axis 508 value.

Continuing with the example of FIGS. 4, 5A, and 5B, the display of the graph 428 includes a single baseline band 506 such that a human user via observation or a computer via a sensor system can easily identify those normalized actual value measurements 436 that are expected, e.g., within an applicable expected measurement range 402, where the set of metrics 404 is a set of four metrics. In this example, a human observer, or a computer with a sensor system, could easily identify system anomaly periods 512 during which the normalized actual value measurements 436 for multiple metrics from the set of performance metrics 404 reached a level outside the plotted baseline band 506 at a same time or during a same time period. In this example, the anomaly periods 512 are indicators of system abnormalities attributable to tested web application 406 or tested application computer system 408. The human observer or computer system that identifies these anomalies could in turn initiate further investigation to gain an understanding the causes for the abnormal behavior and to initiate corrective actions. It should be noted that while in this example an unexpected system anomaly is indicated by a time or time period in which two or more normalized actual value measurements are plotted outside the baseline band 506. In other examples the threshold for denoting a system anomaly event for investigation could be different.

Figure 6:
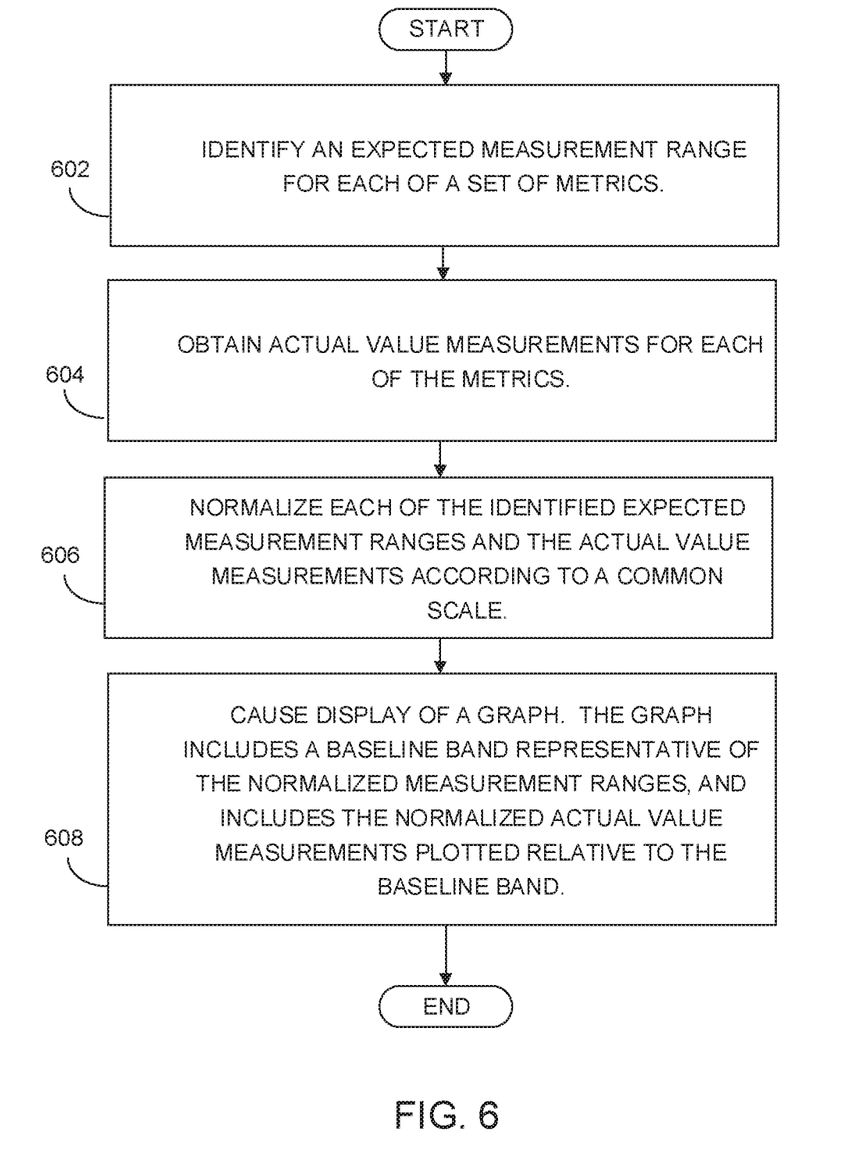
FIG. 6 is a flow diagram depicting implementation of an example of a method for providing displays including normalized actual value measurements and baseline bands representative of normalized measurement ranges.

Operation:

FIG. 6 is a flow diagram of implementation of a method for enabling graphs with normalized actual value measurements and baseline bands representative of normalized measurement ranges. In discussing FIG. 6, reference may be made to the components depicted in FIGS. 2 and 3. Such reference is made to provide contextual examples and not to limit the manner in which the method depicted by FIG. 6 may be implemented. An expected measurement range for each of a set of metrics is identified (block 602). Referring back to FIGS. 2 and 3, measurement range engine 202 (FIG. 2) or measurement range module 302 (FIG. 3), when executed by processing resource 312, may be responsible for implementing block 602.

Actual value measurements for each of the metrics are obtained (block 604). Referring back to FIGS. 2 and 3, observed values engine 204 (FIG. 2) or observed values module 304 (FIG. 3), when executed by processing resource 312, may be responsible for implementing block 604.

Each of the identified expected measurement ranges and the actual value measurements are normalized according to a common scale (block 606). Referring back to FIGS. 2 and 3, common scale engine 206 (FIG. 2) or common scale module 306 (FIG. 3), when executed by processing resource 312, may be responsible for implementing block 606.

A graph is caused to be displayed. The graph includes a baseline band representative of the normalized measurement ranges, and includes the normalized actual value measurements plotted relative to the baseline band (block 608). Referring back to FIGS. 2 and 3, display engine 208 (FIG. 2) or display module 308 (FIG. 3), when executed by processing resource 312, may be responsible for implementing block 608.

Figure 7:
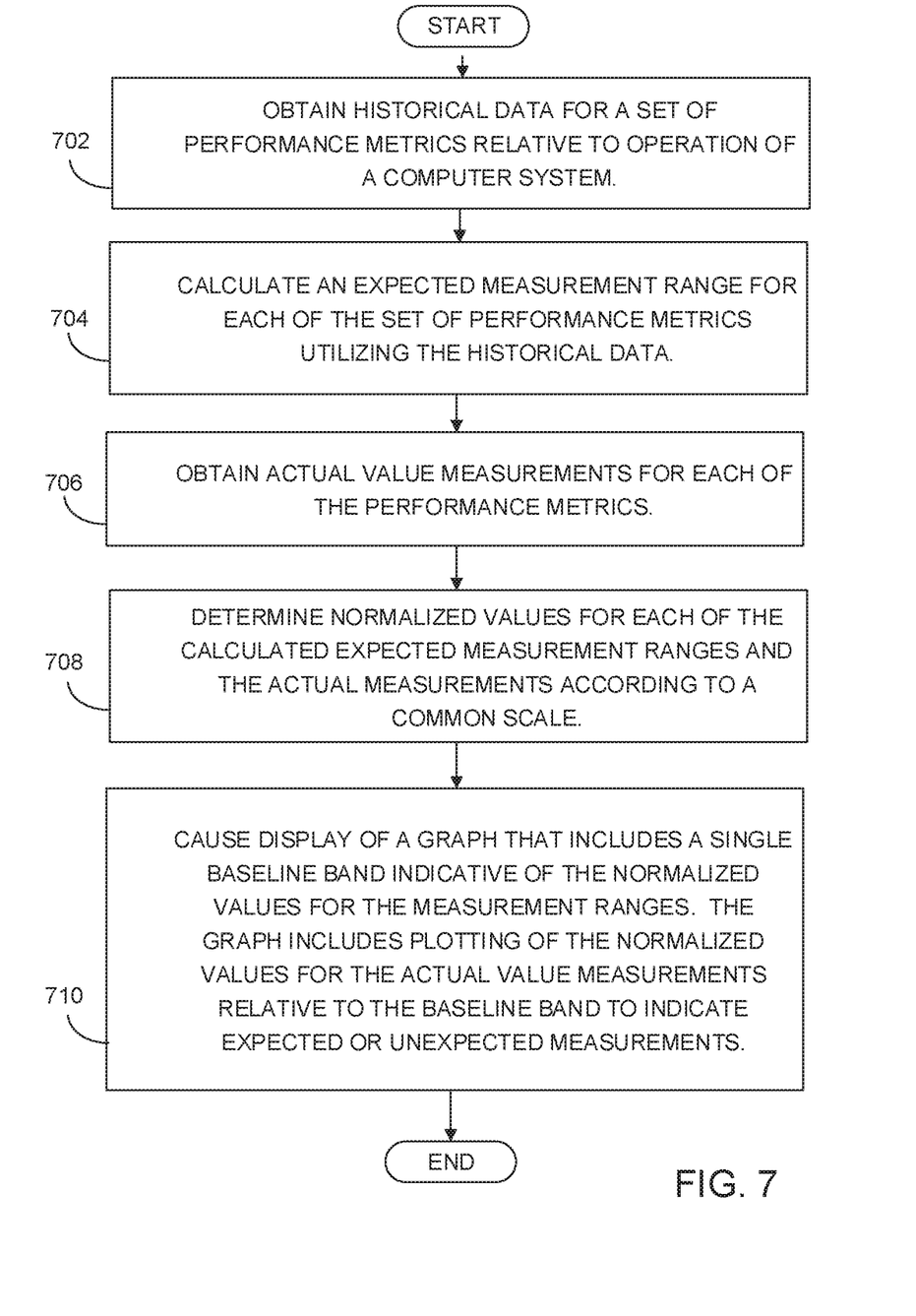
FIG. 7 is a flow diagram depicting implementation of an example of a method for calculating expected measurement ranges for computer system performance metrics, and enabling a display with a baseline band representative of normalized measurement ranges for the metrics.

FIG. 7 is a flow diagram of implementation of a method for calculating expected measurement ranges for computer system performance metrics, and enabling a display with a baseline band representative of normalized measurement ranges for the metrics. In discussing FIG. 7, reference may be made to the components depicted in FIGS. 2 and 3. Such reference is made to provide contextual examples and not to limit the manner in which the method depicted by FIG. 7 may be implemented. Historical data for a set of performance metrics relative to operation of a computer system is obtained (block 702). Referring back to FIGS. 2 and 3, measurement range engine 202 (FIG. 2) or measurement range module 302 (FIG. 3), when executed by processing resource 312, may be responsible for implementing block 702.

An expected measurement range for each of the set of performance metrics is calculated utilizing the historical data (block 704). Referring back to FIGS. 2 and 3, measurement range engine 202 (FIG. 2) or measurement range module 302 (FIG. 3), when executed by processing resource 312, may be responsible for implementing block 704.

Actual value measurements for each of the performance metrics are obtained (block 706). Referring back to FIGS. 2 and 3, observed values engine 204 (FIG. 2) or observed values module 304 (FIG. 3). when executed by processing resource 312, may be responsible for implementing block 706.

Normalized values for each of the calculated expected measurement ranges and the actual value measurements are determined according to a common scale (block 708). Referring back to FIGS. 2 and 3, common scale engine 206 (FIG. 2) or common scale module 306 (FIG. 3), when executed by processing resource 312, may be responsible for implementing block 708.

A graph that includes a single baseline band that is indicative of the normalized values for the expected measurement ranges is caused to be displayed. The graph includes plotting of the normalized values for the actual value measurements relative to the baseline band to indicate expected or unexpected measurements (block 710). Referring back to FIGS. 2 and 3. display engine 208 (FIG. 2) or display module 308 (FIG. 3), when executed by processing resource 312, may be responsible for implementing block 710.

Conclusion:

FIGS. 1-7 aid in depicting the architecture, functionality, and operation of various examples. In particular, FIGS. 1, 2, and 3 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 6 and 7 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been shown and described with reference to the foregoing examples. It is to be understood, however, that other forms, details and examples may be made without departing from the spirit and scope of the invention that is defined in the following claims. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A system comprising:
a processor; and
a non-transitory storage medium storing instructions executable on the processor to:
identify an expected measurement range for each metric of a set of metrics;
obtain actual value measurements for each metric of the set of metrics;
normalize the identified expected measurement ranges according to a common scale to produce normalized expected measurement ranges, and normalize the actual value measurements according to the common scale to produce normalized actual value measurements; and
cause display of a graph including a baseline band representative of the normalized expected measurement ranges, and including the normalized actual value measurements plotted relative to the baseline band, wherein the normalized actual value measurements that correspond to a same point in time or to a same time period are plotted with a same value on an axis of the graph, wherein the baseline band is delineated in the graph by a first graphical border and a second graphical border that are based on the normalized expected measurement ranges, and wherein a first subset of the normalized actual value measurements plotted within the baseline band inside the first and second graphical borders are representative of expected measurements, and a second subset of the normalized actual value measurements plotted outside the first and second graphical borders of the baseline band are representative of unexpected measurements.

2. The system of claim 1, wherein display of normalized actual value measurements from the second subset outside the first and second graphical borders of the baseline band at a same time or same time period for multiple metrics of the set of metrics indicates a system anomaly.

3. The system of claim 1, wherein the instructions are executable on the processor to cause display of the graph to include a first axis representative of time, and a second axis representative of an extent of deviation from the baseline band.

4. The system of claim 1, wherein the baseline band is a single baseline band in the graph.

5. The system of claim 1, wherein the common scale is a standard deviation scale.

6. The system of claim 1, wherein the common scale is a percentile scale.

7. The system of claim 1, wherein the set of metrics comprises a set of performance metrics for a computer system.

8. The system of claim 1, wherein the instructions are executable on the processor to obtain historical data for each metric of the set of metrics, and to calculate the expected measurement range for each metric of the set of metrics utilizing the historical data.

9. The system of claim 1, wherein the first and second graphical borders of the baseline band differ in a feature selected from among a texture or a glossiness.

10. A method comprising:
obtaining, by a system comprising a hardware processor, historical data for a set of performance metrics relative to an operation of a computer system;
calculating, by the system, an expected measurement range for each performance metric of the set of performance metrics utilizing the historical data;
obtaining, by the system, actual value measurements for each performance metric of the set of performance metrics;
determining, by the system, normalized expected measurement ranges based on the expected measurement ranges according to a common scale, and determining normalized actual value measurements based on the actual value measurements according to the common scale; and
causing, by the system, display of a graph that includes a single baseline band that is indicative of the normalized expected measurement ranges, and that includes plotting of the normalized actual value measurements relative to the baseline band, wherein the baseline band is delineated in the graph by a first graphical border and a second graphical border that are based on the normalized expected measurement ranges, and wherein a first subset of the normalized actual value measurements plotted within the baseline band inside the first and second graphical borders are representative of expected measurements, and a second subset of the normalized actual value measurements plotted outside the first and second graphical borders of the baseline band are representative of unexpected measurements.

11. The method of claim 10, wherein the normalized actual value measurements that correspond to a same point in time or to a same time period are plotted with a same value on an axis of the graph.

12. The method of claim 10, wherein the first and second graphical borders of the baseline band differ in a feature selected from among a texture or a glossiness.

13. The method of claim 10, wherein the common scale is a percentile scale.

14. A non-transitory machine-readable storage medium comprising instructions that when executed cause a processing resource to:
identify an expected measurement range for each metric of a set of metrics;
obtain actual value measurements for each metric of the set of metrics;
normalize the identified expected measurement ranges according to a common scale to produce normalized expected measurement ranges, and normalize the actual value measurements according to the common scale to produce normalized actual value measurements; and
cause display of a graph including a baseline band representative of the normalized expected measurement ranges, the graph further including a first subset of the normalized actual value measurements plotted within the baseline band that are representative of expected measurements, and a second subset of the normalized actual value measurements plotted outside the baseline band that are representative of unexpected measurements, wherein the baseline band is delineated by a first graphical border and a second graphical border that are based on the normalized expected measurement ranges, wherein the first and second graphical borders of the baseline band differ in a feature selected from among a texture or a glossiness.

15. The non-transitory machine-readable storage medium of claim 14, wherein the common scale is a standard deviation scale, and wherein the baseline band is representative of a multiple of a standard deviation and marks expected measurements plotted in the graph.

16. The non-transitory machine-readable storage medium of claim 14, wherein the instructions when executed cause the processing resource to obtain historical data for each metric of the set of metrics, and calculate the expected measurement range for each metric of the set of metrics utilizing the historical data.

17. The non-transitory machine-readable storage medium of claim 14, wherein the common scale is a percentile scale.

18. The non-transitory machine-readable storage medium of claim 14, wherein the normalized actual value measurements that correspond to a same point in time or to a same time period are plotted with a same value on an axis of the graph.

19. The non-transitory machine-readable storage medium of claim 14, wherein the first and second graphical borders of the baseline band differ in a color.

\* \* \* \* \*